(12) United States Patent
Vyas et al.

(10) Patent No.: US 7,480,732 B1
(45) Date of Patent: Jan. 20, 2009

(54) MULTICASTING METHOD AND SYSTEM USING AN ATM SWITCH

(75) Inventors: Pankaj Vyas, Bangalore (IN); Balaji Lakshmikanth Bangolae, Bangalore (IN); Amit S. Phadnis, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 655 days.

(21) Appl. No.: 10/126,511

(22) Filed: Apr. 22, 2002

(51) Int. Cl.
*G06F 15/173* (2006.01)

(52) U.S. Cl. ............... 709/238; 709/223; 709/224; 709/225; 709/226; 370/397; 370/398; 370/399; 370/468

(58) Field of Classification Search ......... 709/223–226, 709/238; 370/468, 397–399, 395.1
See application file for complete search history.

(56) References Cited

U.S. PATENT DOCUMENTS

| | | | | |
|---|---|---|---|---|
| 5,473,598 A * | 12/1995 | Takatori et al. | ............. | 370/399 |
| 5,771,231 A * | 6/1998 | Watanabe | .................... | 370/377 |
| 5,867,653 A * | 2/1999 | Aras et al. | .................. | 709/204 |
| 6,104,705 A * | 8/2000 | Ismail et al. | ................ | 370/260 |
| 6,320,864 B1 * | 11/2001 | Hebb et al. | ................. | 370/412 |
| 6,343,326 B2 * | 1/2002 | Acharya et al. | ............. | 709/238 |
| 6,349,089 B1 * | 2/2002 | Bonomi et al. | ........... | 370/230.1 |
| 6,424,629 B1 * | 7/2002 | Rubino et al. | ............ | 370/241.1 |
| 6,563,798 B1 * | 5/2003 | Cheng | ......................... | 370/255 |
| 6,643,262 B1 * | 11/2003 | Larsson et al. | .............. | 370/236 |
| 6,760,774 B1 * | 7/2004 | Soumiya et al. | ............. | 709/233 |
| 7,107,345 B2 * | 9/2006 | Chae | .......................... | 709/227 |
| 2002/0126674 A1 * | 9/2002 | Hemmady | ............... | 370/395.1 |

OTHER PUBLICATIONS

The ATM Forum Technical Committee; Entitled:"ATM User-Network Interface (UNI)Signalling Specification, Version 4.0"; AF-SIG-0061.000; Jul. 1996: Available from www.atmforumcom; (136 Pages).
ITU-T Recommendation I.610 (Feb. 1999); Entitled:"Series I: Integrated Services Digital Network Maintenance principles; B-ISDN operation and maintenance principles and functions"; Available from www.atmforum.com ; (116 pages).

* cited by examiner

*Primary Examiner*—Bunjob Jaroenchonwanit
*Assistant Examiner*—Duyen M Doan
(74) *Attorney, Agent, or Firm*—Narendra R Thappeta

(57) ABSTRACT

A switch may be configured to support a point-to-multi-point PVC which can be used to support a point to multi-point application. The signaling overhead is reduced due to the use of PVC, and the available bandwidth is used efficiently due to the use of the point-to-multi-point connection. Another aspect of the present invention minimizes the resources required while providing such point-to-multi-point virtual connections. A switch may minimize allocation of resources to branches that are not active. For example, a switch may determine that a branch is inactive based on the absence of reception of OAM cells in a specified duration and delete the forwarding information for the inactive branch. The switch may thus scale to support many point-to-multi-point virtual circuits having many branches.

27 Claims, 4 Drawing Sheets

MULTICASTING METHOD AND SYSTEM USING AN ATM SWITCH

BACKGROUND OF THE INVENTION

1. Field of the Invention

The present invention relates to switches used in telecommunication networks, and more specifically to a method and apparatus for efficiently supporting point to multipoint applications.

2. Related Art

Point to multipoint applications generally refer to applications in which the same data is transferred from a single source to multiple destinations. In an example scenario, a service provider transmits data forming a video stream (e.g., movies) on a network to multiple subscribers. The network in turn may be formed by several switches (with connecting paths), which may need to support the transmission of the data.

In one prior approach, a dedicated point-to-point PVC may be provided from the single source to each of the subscribers. One problem with such an approach is that the resulting solution may not scale to large environments containing potentially many thousands of subscribers because a corresponding number of point-to-point PVCs would be needed to be supported from the single source.

The problem may be exacerbated due to the fact that valuable resources such as buffer space in a switch and/or bandwidth on a path/link (connecting switches), may need to be allocated to each of the PVCs irrespective of whether the PVC is in use or not. Allocation of resources to such point-to-point PVCs may prevent support for more PVCs in general.

In an alternative approach, a point-to-point SVC may be provided from a single source to each of the subscribers. As a point-to-point SVC is generally set up only when needed and released (terminated) otherwise, resources may not be dedicated between the source and each subscriber. As a result, the available resources may be optimally used to potentially support a large number of subscribers.

However, one problem with such an alternative approach is that the same data may be transmitted on each of the multiple point-to-point SVCs, and the available bandwidth may not be sufficient to support a large number of subscribers. Another typical problem with the above noted approach is that the overhead of setting up and terminating SVC connections between the source and subscribers may be unacceptably high.

Accordingly, in another prior approach, a point-to-multi-point SVC may be provided from a single source to each of the subscribers. Data to be transferred is duplicated at the source and sent to multiple subscribers. However, the signaling overhead due to the dynamic creation and dropping of unwanted connections between the source and the subscribers may still be unacceptably high. Another problem with the above noted approach is that there may be a time lag in the setting up of the SVC. As a result of the time lag data may be lost during the setting up of SVC. Loss of data while configuring SVC may also be undesirable at least in some environments.

Therefore, what is needed are a method and apparatus for efficiently supporting point to multipoint applications.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

A switch provided according to an aspect of the present invention can be provisioned with a point-to-multi-point PVC, which can be used to support a point-to-multi-point application providing a service to many subscribers. Due to the use of a permanent virtual circuit, the signaling overhead on a network may be prevented. In addition, as the point-to-multi-point PVC can be used to transmit data related to potentially all the subscribers for a substantial number of hops of switches in a path, the total amount of data transferred on a network may be minimized.

Another aspect of the present invention minimizes the resources required in supporting a point-to-multi-point virtual circuit. The resources may be minimized by determining whether each branch is active, and allocate fewer resources to the inactive branches. For example, if an end system corresponding to a subscriber is not connected to communicate with the switch, the VPI/VCI information for the corresponding branch may be removed from the forwarding table maintained in a switch. As resource utilization is minimized for inactive branches, a switch may support a large number of branches.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
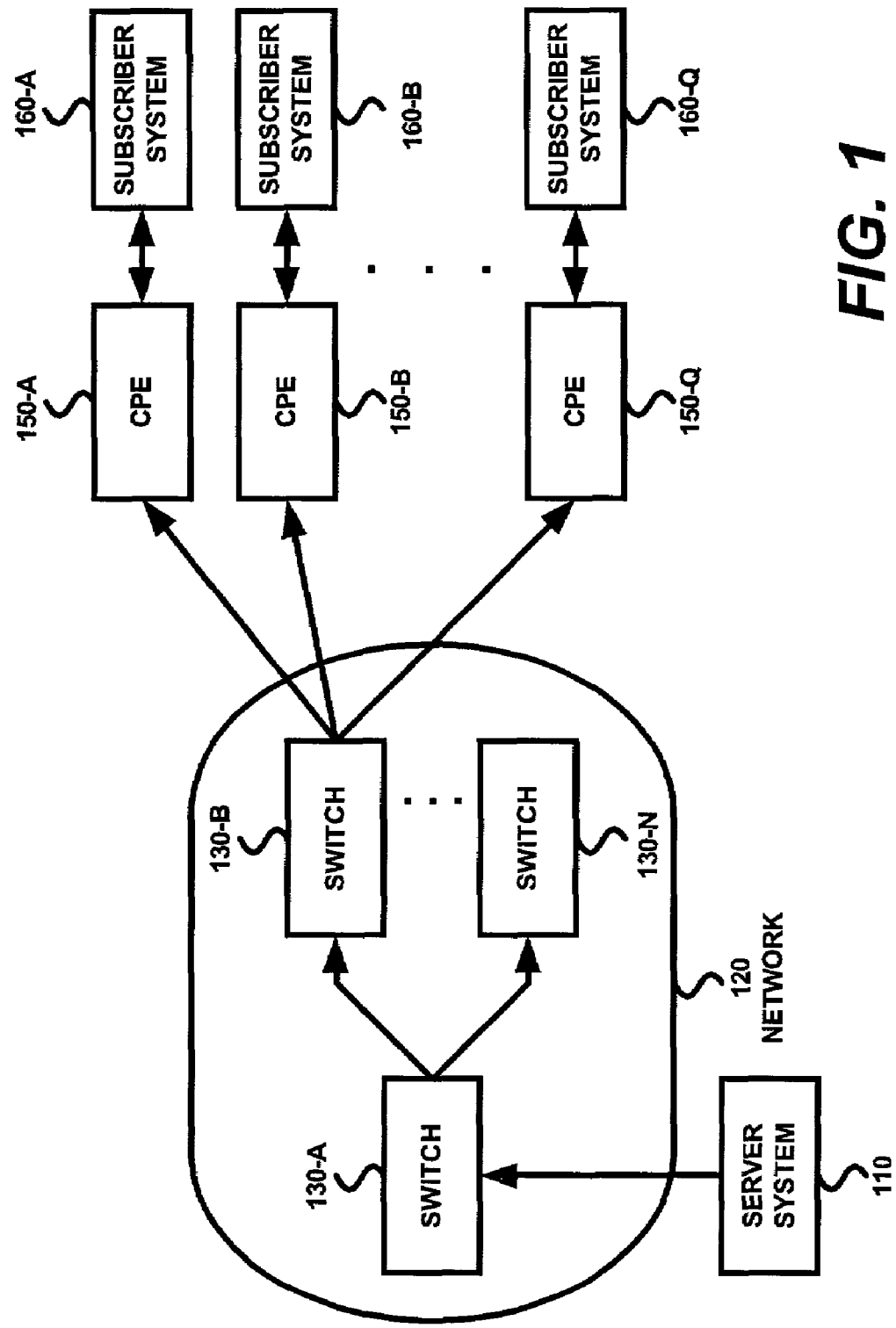
FIG. 1 is a block diagram illustrating an example environment in which the present invention can be implemented.

FIG. 1 is a block diagram illustrating an example environment in which the present invention can be implemented. The environment is shown containing server system 110, network 120, switches 130-A through 130-N, CPE 150-A through 150-Q and subscriber systems 160-A through 160-Q. Each system is described in further detail below.

Server system 110 may represent a system providing a point to multi-point service/application to several subscribers. The application may be based on a point-to-multi-point virtual circuit provided according to various aspects of the present invention. The virtual circuit contains several branches, with each branch eventually connecting to a subscriber (leaf). Only one server system is shown in FIG. 1 for conciseness. However, typical environments contain many more server systems.

Subscriber systems 160-A through 160-Q represent devices such as computer systems and hand-held systems which receive the data sent by server system 110 on network 120. The data forms the basis for accessing the point-tomulti-point application/service provided from server system 110. While the subscriber systems are described as receiving data from server system 110, it should be understood that the data transfer can be in both directions, potentially supporting interactive applications.

CPEs 150-A through 150-Q may be used to provide connectivity to subscriber systems 150-A through 150-Q respectively. The connectivity may be provided by sending and receiving ATM cells. Subscriber systems 160-A through 160-Q, and CPEs 150-A through 150-Q may be implemented in a known way.

Switches 130-A through 130-N (in network 120) may be configured to provide point-to-multi-point virtual circuits to corresponding subscriber systems. The manner in which a point-to-multi-point virtual circuit can be provided is described only with reference to an example scenario in which a point to multi-point application is to be provided from server 110 to subscriber systems 160-A through 160-Q.

In an embodiment, the point-to-multi-point virtual circuit is provided in the form of a permanent virtual circuit, with the connections from switch 130-B (end switch) to CPEs 150-A through 150-Q from the end branches. As may be appreciated, PVCs are generally provisioned by an administrator using a suitable interface. The interface generally causes the switches to be configured with the VPI/VCI values of the (immediately) prior and next path(s) for each connection. Once configured, the PVC continues existence even if not used.

One problem with the point-to-multi-point PVCs is that the number of branches in a switch can be large. The switch may need to allocate resources (e.g., memory space) for each of the branches. However, only some of the branches may be actively used by the corresponding subscribers (systems). As a result, the resources may not be optimally utilized, causing the switch not to scale well to support a larger number of branches. The manner in which the resource utilization can be improved is described below with examples.

3. Optimal Utilization of Resources

Figure 2:
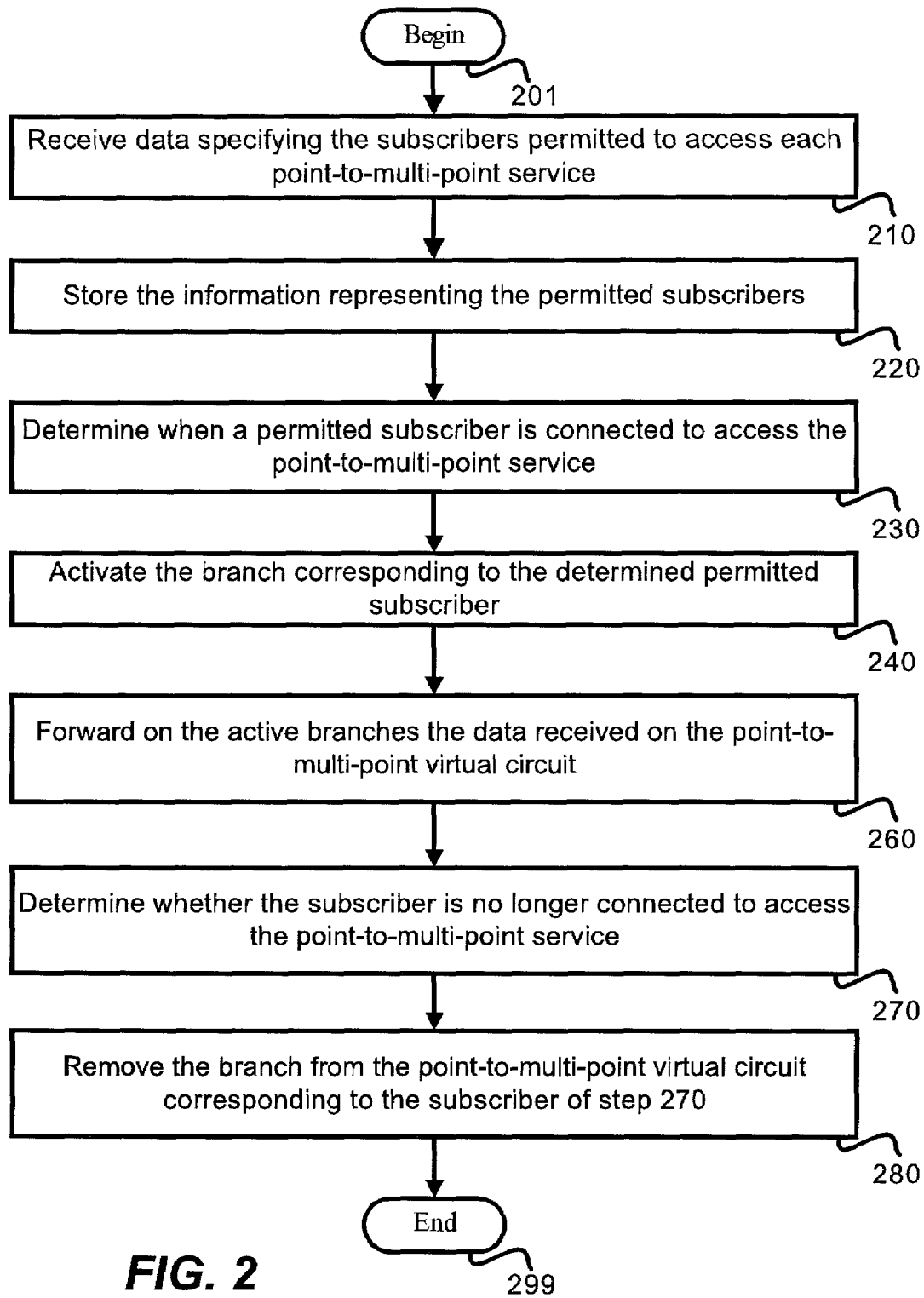
FIG. 2 is a flowchart illustrating a method according to an aspect of the present invention.

FIG. 2 is a flowchart illustrating a method using which a service provider can control access to a point-to-multi-point service while minimizing the resource utilization in a switch. The flowchart is described with reference to FIG. 1 for illustration. The method can be implemented in other environments as well. The method begins in step 201, in which control immediately passes to step 210.

In step 210, data specifying subscribers permitted to access each point-to-multi-point service is received. In step 220, information representing the permitted subscribers is stored. In an embodiment, the data is received as a part of configuration of a point-to-multi-point PVC and the data is stored consistent with the PVC configuration on switch 130-B.

In step 230, switch 130-B determines whether a permitted subscriber is connected to access the point-to-multi-point service. In an embodiment described below, the determination is based on reception of OAM segment loopback cells (example of fault detection cell), which would be generated by a corresponding CPE appropriately connected (and configured) to communicate with switch 130-B.

In step 240, a branch corresponding to the connected subscriber determined in step 230 is activated. Activation entails configuration of switch 130-B to forward data received from server system 110 to the CPE corresponding to the connected subscriber. Switch 130-B may allocate resources (such as memory space, bandwidth, etc.) to the connected subscriber to facilitate such forwarding. only to the identified permitted subscribers. In step 250, data received on the point-to-multi-point virtual circuit is forwarded on all the active branches.

In step 270, switch 130-B may determine whether a subscriber ("unconnected subscriber") is not connected to access point-to-multi-point service. In an embodiment described below, the determination is based on the absence of reception of a OAM segment loopback cell on an active branch for a pre-specified amount of time. Thus, if OAM cells are not received within the specified time, the corresponding subscriber may be determined not to be connected to access the service.

In step 280, switch 130-B makes inactive the branch corresponding to the (unconnected) subscriber determined in step 270. Potentially, no packets may be forwarded on the inactive branch. The branch may be again activated using steps 230 and 240. In an inactive state, the branch may be allocated fewer resources compared to the active state. At least as only fewer resources are allocated for the inactive branches, switch 130-B may support a large number of branches for a point-to-multi-point virtual circuit.

The description is continued with reference to additional example embodiments implemented according to various aspect of the present invention.

4. Switch

Figure 3:
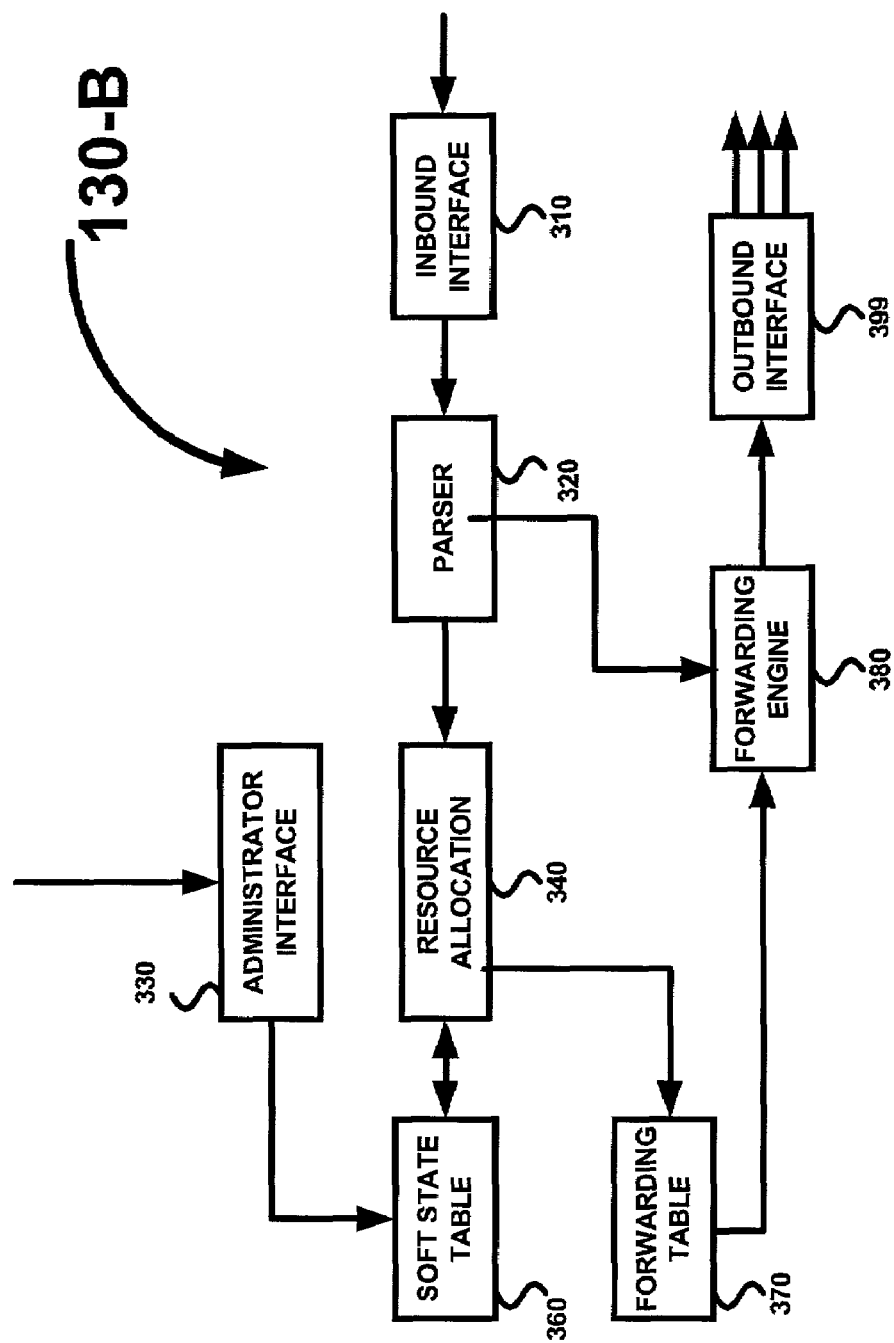
FIG. 3 is a block diagram illustrating the details of implementation of a switch according to an aspect of the present invention.

FIG. 3 is a block diagram illustrating the details of implementation of switch 130-B in an embodiment of the present invention. Switch 130-B is shown containing inbound interface 310, parser 320, administrator (admin) interface 330, resource allocation 340, soft state table 360, forwarding table 370, forwarding engine 380 and outbound interface 390. Each component is described in further detail below.

Inbound interface 310 provides the physical, electrical and other protocol interfaces to receive ATM cells from other switches. The received cells are forwarded to parser 320. Similarly, outbound interface 390 provides the physical, electrical and protocol interfaces to transmit data to the CPEs and switches. Inbound interface 310 and outbound interface 390 may be implemented in a known way.

Parser 320 examines each received cell and forwards each cell to either resource allocation 340 or forwarding engine 380. OAM related cells are sent to resource allocation 340, and cells requiring further forwarding are sent to forwarding engine 380. The manner in which each type of cells are processed is described below in further detail.

Forwarding table 370 may store forwarding information (VPI/VCI of the branches) related to the active branches. Forwarding table 370 may have the capability to store only a limited number of entries (at least for a higher throughput performance), and accordingly it may be desirable to use efficiently the entries of forwarding table 370. The manner in which an aspect of the present invention enables such efficient use is described below.

Soft state table 360 may store data indicating the subscribers ("permitted subscriber") permitted to access each point-to-multi-point service and any related service (QOS) parameters. Thus, soft state table 360 may potentially store information related to all subscribers (of each service), and forwarding table 370 may store information related to only the active branches. As a result, the entries in forwarding table 370 may be efficiently utilized.

Administrator interface 330 may be used to configure soft state table 360 in response to, for example, receiving input from a console (not shown) provided on switch 130-B. Other suitable interfaces may be provided to an administrator to cause soft state table 360 to be configured. As noted above, configured data may specify VPI/VCI value of each branch related to a permitted subscriber, and any associated QOS parameters. Once configured, the values may continue to exist in the table even when the subscribers (leaves) are not connected to the point-to-multi-point circuit.

Resource allocation 340 may determine whether a subscriber is connected to access a corresponding service, and allocate the resources for the connected subscribers. Resources may be deallocated for the unconnected subscribers. With respect to the entries (an example of a resource) in forwarding table 370, resource allocation 340 determines whether a branch (of a point-to-multi-point virtual connection) is active and stores the VPI/VCI data of the active branch in forwarding table 370. The data may be retrieved from soft state table 360.

When an active branch becomes inactive, resource allocation 340 may delete the corresponding entry from forwarding table 370. The status in the soft state table 360 may be updated to indicate that the branch is inactive. Due to the deletion of data related to the inactive branches, the corresponding entries may be available to support additional branches of point-to-multi-point virtual circuits.

In an embodiment, the determination of whether a branch is active or not is based on reception (or absence thereof) of the OAM segment loopback cells. As is well known, OAM cells are periodically sent by devices at either end of a virtual circuit segment to confirm whether the segment is operational end to end. Thus, CPEs 150-A through 150-Q may send such cells periodically on the respective links connecting to switch 130-B. Accordingly, when an OAM cell is received on a link, the corresponding branch may be determined to be active. If OAM cells are not received within a specific duration of time, it the branch may be determined to be inactive.

Only the details of OAM as believed to necessary for an understanding of the described embodiments are included in the present application. For further details on OAM, the reader is referred to ITU-T Recommendation I.610 entitled, "Series I: Integrated Services Digital Network—Maintenance principles B-ISDN operation and maintenance principles and functions", which is incorporated in its entirety herewith.

Forwarding engine 380 forwards cells (received from parser 310) according to the allocated resources. Thus, the entries in forwarding table 370 may be used to determine the branches on which a received cell is to be forwarded. In general, each received cell needs to be identified with a corresponding point-to-multi-point virtual circuit, and forwarding table 370 needs to be examined to determine the forwarding information for all the active branches.

The cell may then be forwarded on all the active branches using the corresponding VPI/VCI specified by forwarding table 370. As forwarding table 370 would contain VPI/VCI information of all the active branches, forwarding engine 380 may forward the cells related to each point-to-multi-point application to all the corresponding subscriber systems.

It should be appreciate that the entries in forwarding table 370 is an example of a resource which may be allocated efficiently according to an aspect of the present invention. Allocation (and deallocation) of other resources such as bandwidth on links, buffer space to store cells related to the connections, etc., may also be implemented without departing from the scope and spirit of the present invention as will be apparent to one skilled in the relevant arts by reading the disclosure provided herein.

It should be understood that the different components of the switches can be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing switch 130-B with a desired mix of hardware, software and/or firmware. An embodiment implemented substantially in software is described below.

5. Software Implementation

Figure 4:
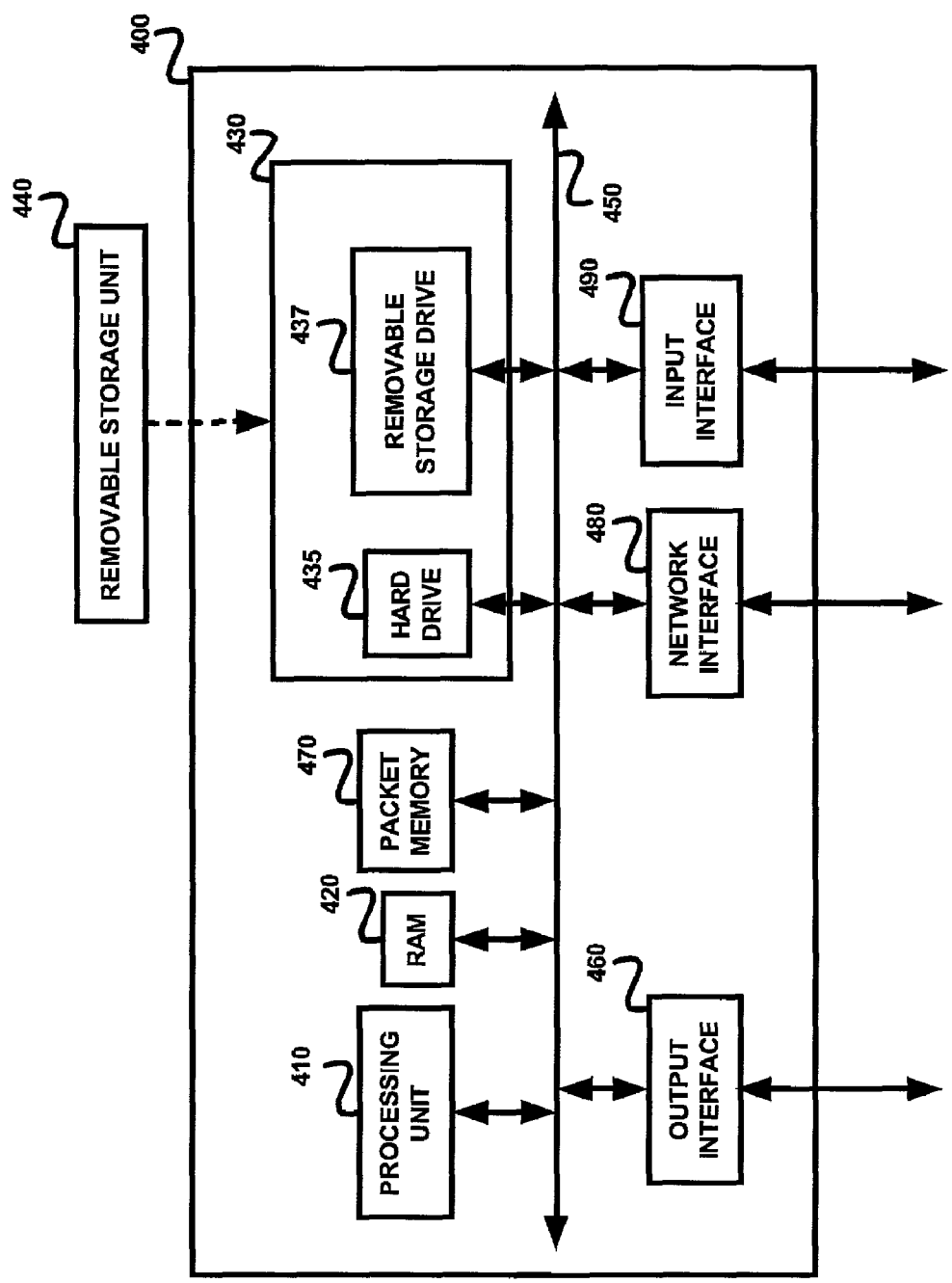
FIG. 4 is a block diagram illustrating the details of implementation of a switch substantially in the form of software.

FIG. 4 is a block diagram illustrating the details of switch 130-B in one embodiment. Switch 130-B is shown containing processing unit 410, random access memory (RAM) 420, storage 430, output interface 460, packet memory 470, network interface 480 and input interface 490. Each block is described in further detail below.

Output interface 460 provides output signals (e.g., display signals to a display unit, not shown) which can form the basis for a suitable interface for an administrator (configuring switch 130-B) to interact with switch 130-B. Input interface 490 (e.g., interface with a key-board and/or mouse, not shown) enables a user/administrator to provide any necessary inputs (e.g., configuration of soft state table 360) to switch 130-B.

Network interface 480 may enable switch 130-B to send and receive data on communication networks using ATM. Network interface 480, output interface 460 and input interface 490 may be implemented in a known way.

RAM 420, storage 430, and packet memory 470 may together be referred to as a memory. RAM 420 receives instructions and data on path 450 from storage 430, and provides the instructions to processing unit 410 for execution. Packet memory 470 stores (queues) packets waiting to be forwarded (or otherwise processed) on different ports.

Secondary memory 430 may contain units such as hard drive 435 and removable storage drive 437. Secondary storage 430 may store the software instructions and data, which enable Switch 130-B to provide several features in accordance with the present invention. While secondary memory 430 is shown contained within switch 130-B, an alternative embodiment may be implemented with the secondary memory implemented external to switch 130-B, and the software instructions (described below) may be provided using network interface 480.

Some or all of the data and instructions may be provided on removable storage unit 440 (or from a network using protocols such as Internet Protocol), and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420.

In general processing unit 410 reads sequences of instructions from various types of memory medium (including RAM 420, storage 430 and removable storage unit 440), and executes the instructions to provide various features of the present invention. In general, such memory medium represents a computer/machine readable storage medium from which instructions can be retrieved and executed by the processors to provide several features of the present invention.

Continuing with combined reference to FIGS. 3 and 4, forwarding table 370 may be stored in RAM 370 (or other high speed memory, a valuable resource) and soft state table 360 may be stored outside of RAM 370 (e.g., in secondary storage 430). In general, the hardware, software and/or firmware which forward cells may be referred to as a switch fabric and forwarding table 370 may be contained within the switch fabric. On the other hand, soft state table 360 may be stored outside of the switch fabric.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of minimizing resources required in a switch to support a point-to-multi-point application from a server system to a plurality of subscribers, wherein said resources comprise a plurality of entries in a forwarding table, said method comprising:

providing in said switch a point-to-multi-point virtual connection containing a plurality of branches, wherein each of said branches is provisioned as a permanent virtual circuit (PVC) and allows data received from said server system to be forwarded to at least one subscriber contained in said plurality of subscribers;

storing a set of VPI/VCIs in said forwarding table, with each of said set of VPI/VCIs identifying a corresponding one of said set of active branches and being stored in a corresponding one of said plurality of entries;

determining whether each branch contained in said plurality of branches is active, wherein a branch is determined to be not active if a segment loopback cell for the branch is not received for a pre-specified amount of time, and to be active otherwise, wherein said segment loopback cell is designed to confirm whether the corresponding branch is operational end-to-end, wherein a set of active branches comprise the specific ones of said plurality of branches determined to be active by said determining; and deleting a VPI/VCI in an entry of said forwarding table if a branch corresponding to the VPI/VCI is determined to be not active, thereby allocating more resources to each of said branches if the corresponding branch is active than if the corresponding branch is not active, wherein each of said branches need not be established by a signaling process if the corresponding branch changes from said inactive state to said active state, and wherein each of the cells received from said server on said point-to-multi-point virtual connection is transmitted on all of said branches which are active, receiving a plurality of cells from said server system for transmission on said point-to-multi-point virtual connection; and forwarding said plurality of cells on all the branches corresponding to the VPI/VCIs of said point-to-multi-point connection in said forwarding table.

2. A computer readable storage medium carrying one or more sequences of instructions for causing a switch to minimize resources required to support a point-to-multi-point application from a server system to a plurality of subscribers, wherein said resources comprise a plurality of entries in a forwarding table, wherein execution of said one or more sequences of instructions by one or more processors contained in said switch causes said one or more processors to perform the actions of:

providing a point-to-multi-point virtual connection containing a plurality of branches, wherein each of said branches is provisioned as a permanent virtual circuit (PVC) and allows data received from said server system to be forwarded to at least one subscriber contained in said plurality of subscribers;

determining whether each branch contained in said plurality of branches is active, wherein a branch is determined to be not active if a segment loopback cell for the branch is not received for a pre-specified amount of time, and to be active otherwise, wherein said segment loopback cell is designed to confirm whether the corresponding branch is operational end-to-end, wherein a set of active branches comprise the specific ones of said plurality of branches determined to be active by said determining;

storing a set of VPI/VCIs in said forwarding table, with each of said set of VPI/VCIs identifying a corresponding one of said set of active branches and being stored in a corresponding one of said plurality of entries;

deleting a VPI/VCI in an entry of said forwarding table if a branch corresponding to the VPI/VCI is determined to be not active, thereby allocating more resources to each of said branches if the corresponding branch is active than if the corresponding branch is not active, wherein each of said branches need not be established by a signaling process if the corresponding branch changes from said inactive state to said active state, and wherein each of the cells received from said server on said point-to-multi-point virtual connection is transmitted on all of said branches which are active, receiving a plurality of cells from said server system for transmission on said point-to-multi-point virtual connection; and forwarding said plurality of cells on all the branches corresponding to the VPI/VCIs of said point-to-multi-point connection in said forwarding table.

3. A switch for minimizing resources used in supporting a point-to-multi-point application from a server system to a plurality of subscribers, wherein said resources comprise a plurality of entries in a forwarding table, said switch comprising:

means for providing in said switch a point-to-multi-point virtual connection containing a plurality of branches, wherein each of said branches is provisioned as a permanent virtual circuit (PVC) and allows data received from said server system to be forwarded to at least one subscriber contained in said plurality of subscribers;

means for determining whether each branch contained in said plurality of branches is active, wherein a branch is determined to be not active if a segment loopback cell for the branch is not received for a pre-specified amount of time, and to be active otherwise, wherein said segment loopback cell is designed to confirm whether the corresponding branch is operational end-to-end, wherein a set of active branches comprise the specific ones of said plurality of branches determined to be active by said determining; and a memory to storing a set of VPI/VCIs in said forwarding table, with each of said set of VPI/VCIs identifying a corresponding one of said set of active branches and being stored in a corresponding one of said plurality of entries;

means for deleting a VPI/VCI in an entry of said forwarding table if a branch corresponding to the VPI/VCI is determined to be not active, thereby allocating more resources to each of said branches if the corresponding branch is active than if the corresponding branch is not active, wherein each of said branches need not be established by a signaling process if the corresponding branch changes from said inactive state to said active state, wherein each of the cells received from said server on said point-to-multi-point virtual connection is transmitted on all of said branches which are active, means for receiving a plurality of cells from said server system for transmission on said point-to-multi-point virtual connection; and means for forwarding said plurality of cells on all the branches corresponding to the VPI/VCIs of said point-to-multi-point connection in said forwarding table.

4. A switch minimizing resources used for supporting a point-to-multi-point application from a server system to a plurality of subscribers, wherein said resources comprise a plurality of entries in a forwarding table, said switch comprising:

an inbound interface receiving a cell from said server system;

a first memory storing forwarding information representing a point-to-multi-point virtual connection containing a plurality of branches, wherein each of said plurality of branches is provisioned as a permanent virtual circuit (PVC) and connected to at least one subscriber system permitted to access said point-to-multi-point application;

a resource allocation block determining whether each branch contained in said plurality of branches is active, and allocating more resources to each of said branches if the corresponding branch is active than if the corresponding branch is not active, wherein a branch is determined to be not active if a segment loopback cell for the branch is not received for a pre-specified amount of time, and to be active otherwise, wherein said segment loopback cell is designed to confirm whether the corresponding branch is operational end-to-end, wherein a set of active branches comprise the specific ones of said plurality of branches determined to be active by said determining, wherein said resource allocation block stores a set of VPI/VCIs in said forwarding table, with each of said set of VPI/VCIs identifying a corresponding one of said set of active branches and being stored in a corresponding one of said plurality of entries, and deletes a VPI/VCI in an entry of said forwarding table if a branch corresponding to the VPI/VCI is determined to be not active; and a forwarding engine forwarding said cell according to the resources allocated by said resource allocation block, wherein said forwarding block forwards said plurality of cells on all the branches corresponding to the VPI/VCIs of said point-to-multi-point connection in said forwarding table, wherein each of said plurality of branches need not be established by a signaling process if the corresponding branch changes from said inactive state to said active state, and wherein each of the cells received from said server on said point-to-multi-point virtual connection is transmitted on all of said branches which are active.

5. A method of supporting a point to multi-point application from a server system to a plurality of subscriber systems according to asynchronous transfer mode (ATM) protocol, said method being performed in an ATM switch, said method comprising:

providing each of a plurality of branches to a corresponding one of said subscriber systems;

storing in a state table information representing a VPI/VCI information corresponding to each of said plurality of branches;

receiving a plurality of cells related to said point to multi-point application from said server system;

forwarding all of said plurality of cells on all of a set of branches, with each of said set of branches having a corresponding one of a set of entries in a forwarding table, wherein said set of branches are comprised in said plurality of branches;

determining whether each of said plurality of branches is active or not active, wherein a first set of branches are determined to be not active and a second set of branches has changed status from not active to active, said first set of branches and said second set of branches being contained in said plurality of branches;

deleting the entry corresponding to each of said first set of branches from said forwarding table if a branch is determined to be not active;

adding an entry corresponding to each of said second set of branches to said forwarding table using the VPI/VCI information in said state table if a branch is determined to be active, wherein more resources are allocated to active branches than to branches that are not active;

wherein said forwarding forwards cells from said server system to all active branches and entries in said forwarding table are used only for active branches.

6. The method of claim 5, wherein said plurality of cells are received on a permanent virtual circuit (PVC) from said server system, said PVC along with said plurality of branches forms a point-to-multipoint PVC.

7. The method of claim 6, wherein said state table is stored in a non-volatile secondary storage.

8. The method of claim 6, wherein said state table stores data representing a plurality of subscribers permitted to access said point-to-multi-point application, wherein each of said plurality of branches is determined to be active if a subscriber at the other end of the branch is connected to communicate with said switch.

9. The method of claim 8, wherein said determining comprises checking whether a fault detection cell is received on said branch within a pre-specified duration.

10. The method of claim 9, wherein said fault detection cell comprises an operation administration and maintenance (OAM) cell according to said ATM protocol.

11. A computer readable storage medium carrying one or more sequences of instructions for causing a switch to support a point to multi-point application from a server system to a plurality of subscriber systems according to asynchronous transfer mode (ATM) protocol, wherein execution of said one or more sequences of instructions by one or more processors contained in said switch causes said one or more processors to perform the actions of:

providing each of a plurality of branches to a corresponding one of said subscriber systems;

storing in a state table information representing a VPI/VCI information corresponding to each of said plurality of branches; receiving a plurality of cells related to said point to multi-point application from said server system;

forwarding all of said plurality of cells on all of a set of branches, with each of said set of branches having a corresponding one of a set of entries in a forwarding table, wherein said set of branches are comprised in said plurality of branches;

determining whether each of said plurality of branches is active or not active, wherein a first set of branches are determined to be not active and a second set of branches has changed status from not active to active, said first set of branches and said second set of branches being contained in said plurality of branches;

deleting the entry corresponding to each of said first set of branches from said forwarding table, wherein each of said first set of branches is determined to be not active;

adding an entry corresponding to each of said second set of branches to said forwarding table using the VPI/VCI information in said state table, wherein each of said second set of branches is determined to be active, wherein more resources are allocated to active branches than to branches that are not active;

wherein said forwarding forwards cells from said server system to all active branches and entries in said forwarding table are used only for active branches.

12. The computer readable medium of claim 11, wherein said plurality of cells are received on a permanent virtual circuit (PVC) from said server system, said PVC along with said plurality of branches forms a point-to-multipoint PVC.

13. The computer readable medium of claim 12, wherein said state table is stored in a non-volatile secondary storage.

14. The computer readable medium of claim 12, wherein said state table stores data representing a plurality of subscribers permitted to access said point-to-multi-point application, wherein each of said plurality of branches is determined to be active if a subscriber at the other end of the branch is connected to communicate with said switch.

15. The computer readable medium of claim 14, wherein said determining comprises checking whether a fault detection cell is received on said branch within a pre-specified duration.

16. The computer readable medium of claim 15, wherein said fault detection cell comprises an operation administration and maintenance (OAM) cell according to said ATM protocol.

17. A switch supporting a point to multi-point application from a server system to a plurality of subscriber systems according to asynchronous transfer mode (ATM) protocol, said switch comprising:

means for providing each of a plurality of branches to a corresponding one of said subscriber systems;

a memory to store a state table information representing a VPI/VCI information corresponding to each of said plurality of branches;

means for receiving a plurality of cells related to said point to multi-point application from said server system;

means for forwarding all of said plurality of cells on all of a set of branches, with each of said set of branches having a corresponding one of a set of entries in a forwarding table, wherein said set of branches are comprised in said plurality of branches;

means for determining whether each of said plurality of branches is active or not active, wherein a first set of branches are determined to be not active and a second set of branches has changed status from not active to active, said first set of branches and said second set of branches being contained in said plurality of branches;

means for deleting the entry corresponding to each of said first set of branches from said forwarding table, wherein each of said first set of branches is determined to be not active;

means for adding an entry corresponding to each of said second set of branches to said forwarding table using the VPI/VCI information in said state table, wherein each of said second set of branches is determined to be active, wherein more resources are allocated to active branches than to branches that are not active;

wherein said forwarding forwards cells from said server system to all active branches and entries in said forwarding table are used only for active branches.

18. The switch of claim 17, wherein said plurality of cells are received on a permanent virtual circuit (PVC) from said server system, said PVC along with said plurality of branches forms a point-to-multipoint PVC.

19. The switch of claim 18, wherein said state table is stored in a non-volatile secondary storage.

20. The switch of claim 18, wherein said state table stores data representing a plurality of subscribers permitted to access said point-to-multi-point application, wherein each of said plurality of branches is determined to be active if a subscriber at the other end of the branch is connected to communicate with said switch.

21. The switch of claim 20, wherein said means for determining checks whether a fault detection cell is received on said branch within a pre-specified duration.

22. A switch supporting a point to multi-point application from a server system to a plurality of subscriber systems according to asynchronous transfer mode (ATM) protocol, said switch comprising:

a memory to store a state table containing store information representing a VPI/VCI information corresponding to each of a plurality of branches connecting said switch to a corresponding one of said subscriber systems;

a forwarding table to contain a set of entries for corresponding set of branches, wherein said set of branches are comprised in said plurality of branches;

a resource allocation block determining to determine whether each of said plurality of branches is active or not active, wherein a first set of branches are determined to be not active and a second set of branches has changed status from not active to active, said first set of branches and said second set of branches being contained in said plurality of branches, said resource allocation block to delete the entry corresponding to each of said first set of branches from said forwarding table, wherein each of said first set of branches is determined to be not active, said resource allocation block to add an entry corresponding to each of said second set of branches to said forwarding table using the VPI/VCI information in said state table, wherein each of said second set of branches is determined to be active, wherein more resources are allocated to active branches than to branches that are not active;

an input interface to receive a plurality of cells related to said point to multi-point application from said server system; and a forwarding block forwarding to forward all of said plurality of cells on each of said set of branches, wherein said forwarding block forwards cells from said server system to all active branches and entries in said forwarding table are used only for active branches.

23. The switch of claim 22, wherein said plurality of cells are received on a permanent virtual circuit (PVC) from said server system, said PVC along with said plurality of branches forms a point-to-multipoint PVC.

24. The switch of claim 23, wherein said state table is stored in a non-volatile secondary storage.

25. The switch of claim 23, wherein said state table stores data representing a plurality of subscribers permitted to access said point-to-multi-point application, wherein each of said plurality of branches is determined to be active if a subscriber at the other end of the branch is connected to communicate with said switch, wherein said resource allocation block stores a VPI/VCI in said forwarding table, wherein said VPI/VCI is associated with said branch determined to be active.

26. The switch of claim 25, wherein said resource determination block checks whether a fault detection cell is received on said branch within a pre-specified duration to determine whether said first branch is active.

27. The switch of claim 26, wherein said fault detection cell comprises an operation administration and maintenance (OAM) cell according to said ATM protocol.

* * * * *